United States Patent
CaraDonna et al.

(10) Patent No.: US 10,067,841 B2
(45) Date of Patent: *Sep. 4, 2018

(54) FACILITATING N-WAY HIGH AVAILABILITY STORAGE SERVICES

(71) Applicant: NetApp, Inc., Sunnyvale, CA (US)

(72) Inventors: Joseph CaraDonna, Ashland, MA (US); Rajesh Rajaraman, Acton, MA (US); Ahmed Shihab, Danville, CA (US); Jason Goldschmidt, Newton, MA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/495,817

(22) Filed: Apr. 24, 2017

(65) Prior Publication Data

US 2017/0228298 A1    Aug. 10, 2017

Related U.S. Application Data

(63) Continuation of application No. 14/608,756, filed on Jan. 29, 2015, now Pat. No. 9,632,890, which is a
(Continued)

(51) Int. Cl.
*G06F 11/00* (2006.01)
*G06F 11/16* (2006.01)
(Continued)

(52) U.S. Cl.
CPC ...... *G06F 11/1658* (2013.01); *G06F 11/0793* (2013.01); *G06F 11/2033* (2013.01);
(Continued)

(58) Field of Classification Search
CPC ............. G06F 11/0793; G06F 11/1484; G06F 11/1658; G06F 11/2033; G06F 11/2056; G06F 11/2092; G06F 11/2094
See application file for complete search history.

(56) References Cited

U.S. PATENT DOCUMENTS 5,790,775 A    8/1998  Marks et al.
6,629,264 B1   9/2003  Sicola et al.
(Continued)

OTHER PUBLICATIONS

International Search Report and Written Opinion for Application No. PCT/US2015/031906 dated Oct. 8, 2015, 14 pages.
(Continued)

*Primary Examiner* — Michael Maskulinski
(74) *Attorney, Agent, or Firm* — Gilliam IP PLLC

(57) ABSTRACT

A passive state storage controller monitors a plurality of active state storage controllers to determine when a failure of at least one of the active state storage controllers occurs. Based on a determination of a failure, the passive state storage controller remaps storage devices to the passive state storage controller from the failed storage controller. The passive state storage controller may also remap network interfaces. The passive state storage controller retrieves a transaction log of the failed storage controller from a transaction log database, and replays transactions in the retrieved transaction log. The passive state storage controller switches to operating in an active state.

20 Claims, 6 Drawing Sheets

Related U.S. Application Data continuation-in-part of application No. 14/325,897, filed on Jul. 8, 2014.

(51) Int. Cl.
  *G06F 11/20* (2006.01)
  *G06F 11/07* (2006.01)

(52) U.S. Cl.
  CPC ...... *G06F 11/2056* (2013.01); *G06F 11/2092* (2013.01); *G06F 2201/805* (2013.01); *G06F 2201/85* (2013.01)

(56) References Cited

U.S. PATENT DOCUMENTS

| | | |
|---|---|---|
| 7,111,189 B1 | 9/2006 | Sicola et al. |
| 7,171,524 B2 | 1/2007 | Kobayashi et al. |
| 7,808,889 B1 | 10/2010 | Howard |
| 8,107,467 B1 | 1/2012 | Madnani et al. |
| 8,255,739 B1 | 8/2012 | Chatterjee et al. |
| 8,443,119 B1 | 5/2013 | Limaye et al. |
| 2002/0133735 A1 | 9/2002 | McKean et al. |
| 2003/0188233 A1 | 10/2003 | Lubbers et al. |
| 2003/0200398 A1 | 10/2003 | Harris |
| 2005/0138461 A1 | 6/2005 | Allen et al. |
| 2007/0283186 A1 | 12/2007 | Madnani et al. |
| 2008/0005614 A1 | 1/2008 | Lubbers et al. |
| 2008/0201616 A1 | 8/2008 | Ashmore |
| 2012/0117416 A1 | 5/2012 | McLaughlin |
| 2012/0173713 A1* | 7/2012 | Wang ............... G06F 11/073 709/224 |
| 2012/0278429 A1 | 11/2012 | Miura et al. |
| 2013/0067274 A1 | 3/2013 | Huang et al. |
| 2013/0132946 A1 | 5/2013 | Ma |
| 2013/0151653 A1* | 6/2013 | Sawicki ............ G06F 15/17331 709/216 |
| 2013/0151888 A1 | 6/2013 | Bhattiprolu et al. |
| 2013/0346790 A1 | 12/2013 | Elpula et al. |

OTHER PUBLICATIONS

International Search Report and Written Opinion for Application No. PCT/US2015/051631 dated Dec. 23, 2015, 14 pages.
Tanenbaum, "Structured Computer Organization," Prentice Hall, Englewood Cliffs, New Jersey, 3rd Edition, 1990, pp. 1-30.
European Office Action dated Oct. 12, 2017 for European Application No. EP15728288 filed May 21, 2015, 11 pages.

* cited by examiner

FACILITATING N-WAY HIGH AVAILABILITY STORAGE SERVICES

FIELD

This technology relates to failover in data storage networks, and more particularly to methods and devices for providing high availability storage services.

BACKGROUND

A storage fabric may include multiple storage controllers, including physical and/or virtual storage controllers, which store and manage data on behalf of clients. Applications utilizing such storage systems rely on continuous data availability. Accordingly, with respect to physical storage controllers, one common technique to provide high availability is to cross wire storage drives or fabric between two physical storage controllers to provide a seamless transfer if one of the physical storage controllers fails.

While both physical storage controllers can operate simultaneously, neither physical storage controller should operate at greater than half capacity since each of the physical storage controller may need to service the traffic previously serviced by a failed one of the physical storage controllers. Accordingly, providing high availability in the context of physical storage controllers requires maintaining significantly underutilized storage controllers with excess headroom, which is undesirable particularly considering the relatively high cost of the hardware required to implement the physical storage controllers. Additionally, the pairing of storage controllers is not an optimal solution in platforms requiring significant scalability.

While virtual storage controllers generally require relatively lower cost to implement than physical storage controllers, and therefore underutilization is not a significant concern, platforms on which virtual storage controllers are implemented may not allow sharing of the same storage drives or fabric between virtual storage controllers or, more specifically, the virtual machines on which the virtual storage controllers are executed. Accordingly, cloud platform providers do not offer virtual storage controllers a shared storage fabric.

Instead, high availability for cloud platforms is often implemented using mirroring of the stored data, requiring replication and associated storage costs, which can be significant. Another technique is simply to reboot a failed virtual storage controller. However, rebooting generally takes on the order of several minutes within which applications relying on the services provided by a failed virtual storage controller will generally fail themselves. Therefore, providing high availability of virtual storage controllers on a cloud platform generally results in significant additional storage cost or application disruption and/or failure.

SUMMARY

A method for facilitating n-way high availability storage services includes monitoring, with one or more passive storage controllers, a plurality of active storage controllers. A determination is made, with one of the passive storage controllers, when a failure of one of the active storage controllers has occurred based on the monitoring. Storage device(s) previously assigned to the one of the active storage controllers are remapped, with the passive storage controller, to the passive storage controller. The transaction log associated with the failed storage controller is retrieved by the passive storage controller, from a transaction log database. Transaction(s) in the transaction log are replayed by the passive storage controller, and upon completion the passive storage controller transitions its role to an active storage controller. When the previously failed controller is healed, it returns to the storage fabric with the role of a passive controller.

An apparatus includes a processor and a memory coupled to the processor which is configured to be capable of executing programmed instructions comprising and stored in the memory to monitor with a passive storage controller a plurality of active storage controllers. A determination is made with the passive storage controller when a failure of one of the active storage controllers has occurred based on the monitoring. Storage device(s) previously assigned to the one of the active storage controllers are remapped to the passive storage controller. The transaction log associated with the failed storage controller is retrieved by a passive storage controller, from a transaction log database. Transaction(s) in the transaction log are replayed by the passive storage controller, and upon completion the passive storage controller transitions its role to an active storage controller. When the previously failed controller is healed, it returns to the storage fabric with the role of a passive controller.

A non-transitory computer readable medium having stored thereon instructions for facilitating n-way high availability storage services includes executable code which when executed by a processor, causes the processor to perform steps including monitoring with a passive storage controller a plurality of active storage controllers. A determination is made with the passive storage controller when a failure of one of the active storage controllers has occurred based on the monitoring. Storage device(s) previously assigned to the one of the active storage controllers are remapped with the passive storage controller to the passive storage controller. The transaction log associated with the failed storage controller is retrieved by a passive storage controller, from a transaction log database. Transaction(s) in the transaction log are replayed by the passive storage controller, and upon completion the passive storage controller transitions its role to an active storage controller. When the previously failed controller is healed, it returns to the storage fabric with the role of a passive controller.

This technology provides a number of advantages including more efficient and effective methods, non-transitory computer readable media, and host devices for facilitating high availability storage services. With this technology, a storage controller can assume the role and responsibility of a storage controller that has failed, without having to return traffic to a recovered storage controller, reserve headroom in the active controller, or replicate data. This technology is highly scalable and high availability can be provided for many or "n" active storage controllers by only one passive storage controller, although more passive storage controllers can be utilized depending on the desired level of protection.

DETAILED DESCRIPTION

Figure 1:
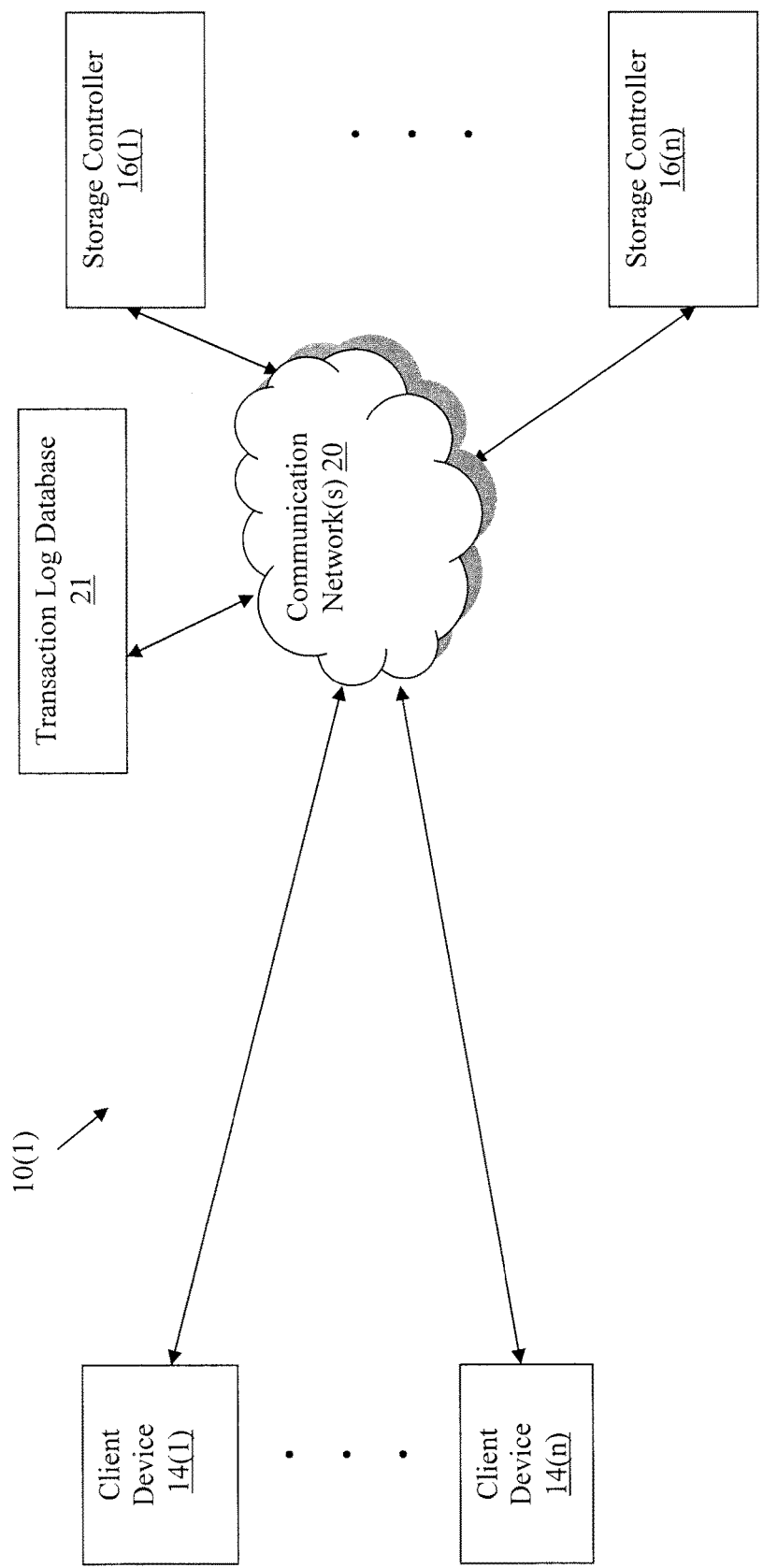
FIG. 1 a block diagram of a network environment with an exemplary storage fabric including a plurality of exemplary storage controllers.

A network environment 10(1) including a storage fabric with client devices 14(1)-14(n), storage controllers 16(1)-16(n), and a transaction log database 21 coupled together by communication network(s) 20 is illustrated in FIG. 1, although this environment 10(1) can include other numbers and types of systems, devices, components, and/or elements in other configurations, such as multiple numbers of each of these apparatuses and devices. By way of example only, the storage controllers 16(1)-16(n) can be virtual storage controllers running as virtual machines or physical storage controllers included in purpose built storage arrays. This technology provides a number of advantages including methods, non-transitory computer readable medium, and devices that relatively efficiently facilitate n-way high availability of storage services provided by storage controllers.

Each of the client devices 14(1)-14(n) in this example can include a processor, a memory, a network interface, an input device, and a display device, which are coupled together by a bus or other link, although each of the client devices 14(1)-14(n) can have other types and numbers of components or other elements and other numbers and types of network devices could be used. The client devices 14(1)-14(n) may run interface applications that provide an interface to make requests for and send content and/or data to the storage controllers 16(1)-16(n) via the communication network(s) 20, for example. Each of the client devices 14(1)-14(n) may be, for example, a conventional personal computer, a workstation, a smart phone, a virtual machine running in a cloud, or other processing and/or computing device.

The transaction log database 21 can optionally be hosted by a shared memory server, which includes a processor, a memory, and a network interface coupled together by a bus or other communication link, and can be an in-memory database or cache or flash-based storage, for example, although other types of storage can also be used for the transaction log database 21. The transaction log database 21 is configured to store a plurality of transaction logs, each associated with an active storage controller, which are used by the active storage controllers to store information associated with transactions received from the client devices 14(1)-14(n), for example, although the transaction logs can also be used to store other information received from other sources, as described and illustrated in more detail later.

The communication network(s) 20 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) 20 may also comprise any local area network and/or wide area network (e.g., Internet), although any other type of traffic network topologies may be used.

Figure 2:
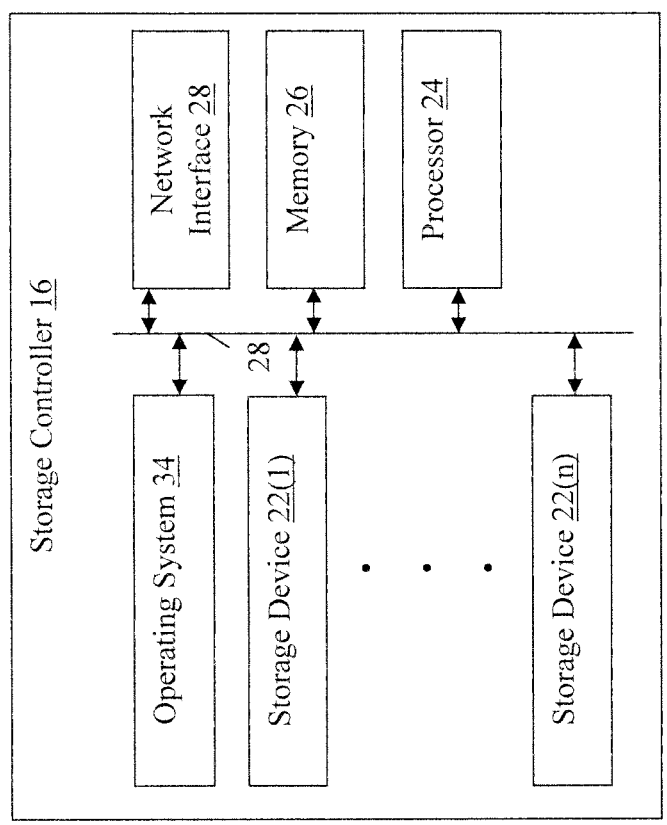
FIG. 2 is a block diagram of an exemplary storage controller.

Referring more specifically to FIG. 2, a block diagram of an exemplary one of the storage controllers 16(1)-16(n) is illustrated. The storage controller 16 in this example includes a processor 24, a memory 26, at least one network interface 28, storage devices 22(1)-22(n), and an operating system 34 coupled together by a bus 28 or other communication link.

The storage controller 16 can be operating in an active or passive state, as described and illustrated in more detail later. In an active state, the storage controller 16 services traffic associated with the storage and retrieval of data stored by one or more of the storage devices 22(1)-22(n), for example. In a passive state, the storage controller 16 monitors one or more active storage controllers to determine when one of the active storage controllers fails, at which time the storage controller 16 operating in a passive state assumes the role of the failed one of the active storage controllers, as described and illustrated in more detail later.

The processor 24 of the storage controller 16 may execute programmed instructions stored in the memory 26 for various functions and/or operations illustrated and described herein. The memory 26 of the storage controller 16 may include any of various forms of read only memory (ROM), random access memory (RAM), Flash memory, non-volatile, or volatile memory, or the like, or a combination of such devices, for example.

The network interface 28 operatively couples and communicates between the storage controller 16, the client devices 14(1)-14(n), and the transaction log database 21, which are all coupled together by the communication network(s) 20, although other types and numbers of connections and configurations to other devices and elements can also be used. By way of example only, the communication network(s) 20 can use TCP/IP over Ethernet and industry-standard protocols, including NFS, CIFS, SOAP, XML, LDAP, and SNMP, although other types and numbers of communication networks, can also be used.

The storage devices 22(1)-22(n) in this example can include conventional magnetic disks, solid-state drives (SSDs), or any other type of stable, non-volatile storage device suitable for storing large quantities of data. The storage devices 22(1)-22(n) may be organized into one or more volumes of Redundant Array of Inexpensive Disks (RAID).

Although examples of the client devices 14(1)-14(n), storage controllers 16(1)-16(n), and transaction log database 21 are described herein, it is to be understood that the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

Figure 3:
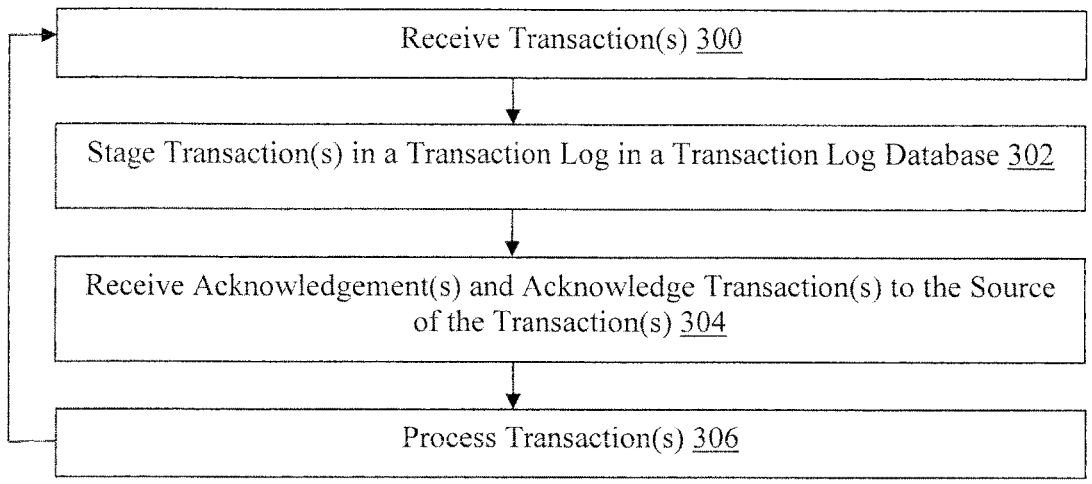
FIG. 3 is a flowchart of an exemplary method for facilitating n-way high availability storage services with an active storage controller.

An exemplary method for facilitating n-way high availability storage services will now be described with reference to FIGS. 1-7. Referring more specifically to FIG. 3, an exemplary method for facilitating high availability storage services with an active one of the storage controllers 16(1)-16(n) is illustrated. In step 300 in this example, the active one of the storage controllers 16(1)-16(n) receives one or more transactions, such as from one or more of the client devices 14(1)-14(n), for example, although the transactions can be received from other sources including internal processes executing on the active one of the storage controllers 16(1)-16(n). Exemplary transactions can include requests from one of the client devices 14(1)-14(n) to read or write data, although other numbers and types of transactions can be received in step 300.

In step 302, the active one of the storage controllers 16(1)-16(n) stages the transactions, such as by storing the one or more transactions in the transaction log database 21 in a transaction log associated with the active one of the storage controllers 16(1)-16(n), for example. The transactions are staged because they may be received more quickly than they can be processed by the one of the active one of the storage controllers 16(1)-16(n). Generally, processing the transactions requires a relatively long period of time considering the mechanical nature of the operation of storing and retrieving data on disks of the storage devices 22(1)-22(n).

In this example, the active one of the storage controllers 16(1)-16(n) can send the one or more transactions to the transaction log database 21 with a unique identifier of the active one of the storage controllers 16(1)-16(n). Upon receipt, the transaction log database 21 stores the one or more transactions in a transaction log associated with the active one of the storage controllers 16(1)-16(n), as identified based on the unique identifier. Optionally, only a subset of the one or more transactions received in step 300 are sent to the transaction log database 21, such as those write transactions that affect data stored by the storage devices 22(1)-22(n), for example.

In step 304, the active one of the storage controllers 16(1)-16(n) executing on the host device 12 receives an acknowledgement that each transaction was successfully stored by the transaction log database 21. After receiving each acknowledgement, the active one of the storage controllers 16(1)-16(n) acknowledges the transaction to the source of the transactions, such as one or more of the client devices 14(1)-14(n), for example.

In step 306, the active one of the storage controllers 16(1)-16(n) processes the transactions received in step 300 from the corresponding transaction log in the transaction log database 21, such as by retrieving requested data from one or more of the storage devices 22(1)-22(n) and/or writing data to one or more of the storage devices 22(1)-22(n), for example.

Figure 4:
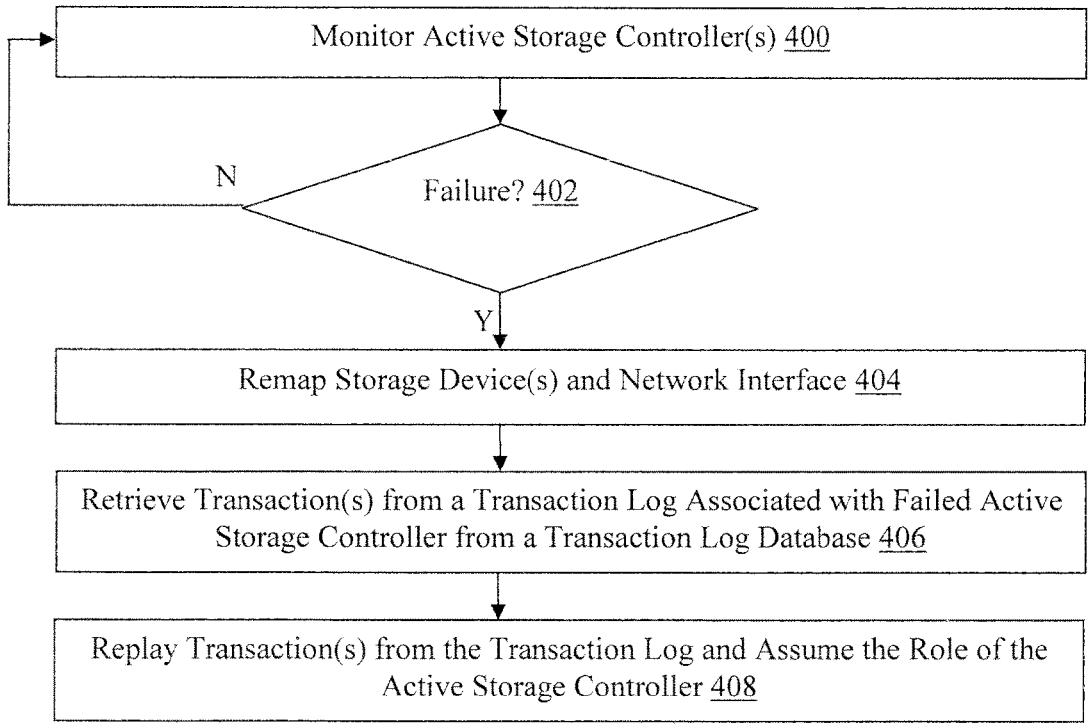
FIG. 4 is a flowchart of an exemplary method for facilitating high availability storage services with a passive storage controller.

Referring more specifically to FIG. 4, an exemplary method for facilitating n-way high availability storage services with a passive one of the storage controllers 16(1)-16(n) is illustrated. In step 400 in this example, the passive one of the storage controllers 16(1)-16(n) monitors one or more active ones of the storage controllers 16(1)-16(n). Accordingly, the passive one of the storage controllers 16(1)-16(n) may monitor any numbers of active ones of the storage controllers 16(1)-16(n) and/or other numbers of passive ones of the storage controllers 16(1)-16(n) could be used to monitor the active ones of the storage controllers 16(1)-16(n).

The monitoring can be based on a heartbeat signal periodically sent from the monitored one or more of the active ones of the storage controllers 16(1)-16(n) to the passive one of the storage controllers 16(1)-16(n) using an interconnect or other communication link, for example. The monitored one or more active ones of the storage controllers 16(1)-16(n) can be configured to periodically initiate the heartbeat signal or the passive one of the storage controllers 16(1)-16(n) can periodically send a message using the interconnect or other communication link to prompt the monitored active ones of the storage controllers 16(1)-16(n) to send the heartbeat signal.

In some examples, the heartbeat message received from each of the monitored active ones of the storage controllers 16(1)-16(n) includes a unique identifier of the respective one of the active ones of the storage controllers 16(1)-16(n), which is used as described and illustrated in more detail later. Other methods of monitoring the health of one or more of the active ones of the storage controllers 16(1)-16(n) also can be used.

In step 402, the passive one of the storage controllers 16(1)-16(n) determines whether a monitored active one of the storage controllers 16(1)-16(n) has entered a failure state. In this example, the passive one of the storage controllers 16(1)-16(n) can determine whether the active one of the storage controllers 16(1)-16(n) has failed based on whether it has received a heartbeat signal within a specified period of time since a prior heartbeat signal.

In another example, the active one of the storage controllers 16(1)-16(n) can be configured to communicate to the passive one of the storage controllers 16(1)-16(n), using an interconnect or other communication link, that it has entered a failure state. Other methods of determining that the active one of the storage controllers 16(1)-16(n) has failed also can be used. In this example, the failure identified by the passive one of the storage controllers 16(1)-16(n) can be of the one of the operating systems 34 of the monitored one of the active storage controllers 16(1)-16(n), a hypervisor failure, or a hardware failure, for example.

If the passive one of the storage controllers 16(1)-16(n) determines in step 402 that none of the monitored active ones of the storage controllers 16(1)-16(n) has failed, then the No branch is taken back to step 400 and the passive one of the storage controllers 16(1)-16(n) continues to monitor active ones of the storage controllers 16(1)-16(n) and effectively wait for one of the active ones of the storage controllers 16(1)-16(n) to fail.

Referring back to step 402, if the passive one of the storage controllers 16(1)-16(n) determines that one of the active ones of the storage controllers 16(1)-16(n) has failed, then the Yes branch is taken to step 404. In step 404, the passive one of the storage controllers 16(1)-16(n) remaps at least one or more of the storage devices 22(1)-22(n) previously assigned to the failed active one of the storage controllers 16(1)-16(n) to be assigned to the passive one of the storage controllers 16(1)-16(n). The remapped one or more of the storage devices 22(1)-22(n) also can be virtual storage devices corresponding to one or more of the storage devices 22(1)-22(n) or portions thereof, for example. In one example, in order to remap the one or more of the storage devices 22(1)-22(n), the passive one of the storage controllers 16(1)-16(n) can make call(s) to an application programming interface (API) supported by the cloud platform provider, for example, although other methods of remapping the one or more of the storage devices 22(1)-22(n) can also be used.

In some examples, the passive one of the storage controllers 16(1)-16(n) also remaps the network interface 28, or more specifically a network interface controller (NIC) of the network interface 28, previously assigned to the failed active one of the storage controllers 16(1)-16(n) to be associated with the passive one of the storage controllers 16(1)-16(n). By remapping the NIC, an application associated with one or more of the client devices 14(1)-14(n) previously communicating with the one of the operating systems 34 associated with the failed active one of the storage controllers 16(1)-16(n) can communicate with the operating system 34 of the passive one of the storage controllers 16(1)-16(n). The NIC can be remapped using call(s) to the API provided by the cloud platform provider or through IP address translation of the traffic received from one or more of the client devices 14(1)-14(n), as managed by the operating system 34, for example, although other methods of remapping the NIC can also be used.

In step 406, the passive one of the storage controllers 16(1)-16(n) retrieves the transaction log associated with the failed one of the active storage controllers 30(1)-30(n) from the transaction log database 21. The passive one of the storage controllers 16(1)-16(n) can use a unique identifier of the failed active one of the storage controllers 16(1)-16(n), such as communicated with the heartbeat signal, for example, to retrieve the transaction log corresponding to the failed active one of the storage controllers 16(1)-16(n), although other methods of identifying and/or retrieving the transaction log associated with the failed active one of the storage controllers 16(1)-16(n) can also be used.

In step 408, the passive one of the storage controllers 16(1)-16(n) replays the transactions stored in the transaction log retrieved in step 406 and effectively assumes the role of the failed active one of the storage controllers 16(1)-16(n). In parallel, the failed active one of the storage controllers 16(1)-16(n), performs a failure processing routine including performing a core dump and rebooting the associated operating system 34, for example. Upon rebooting, the failed active one of the storage controllers 16(1)-16(n) can effectively assume the role of the passive one of the storage controllers 16(1)-16(n).

Figure 5:
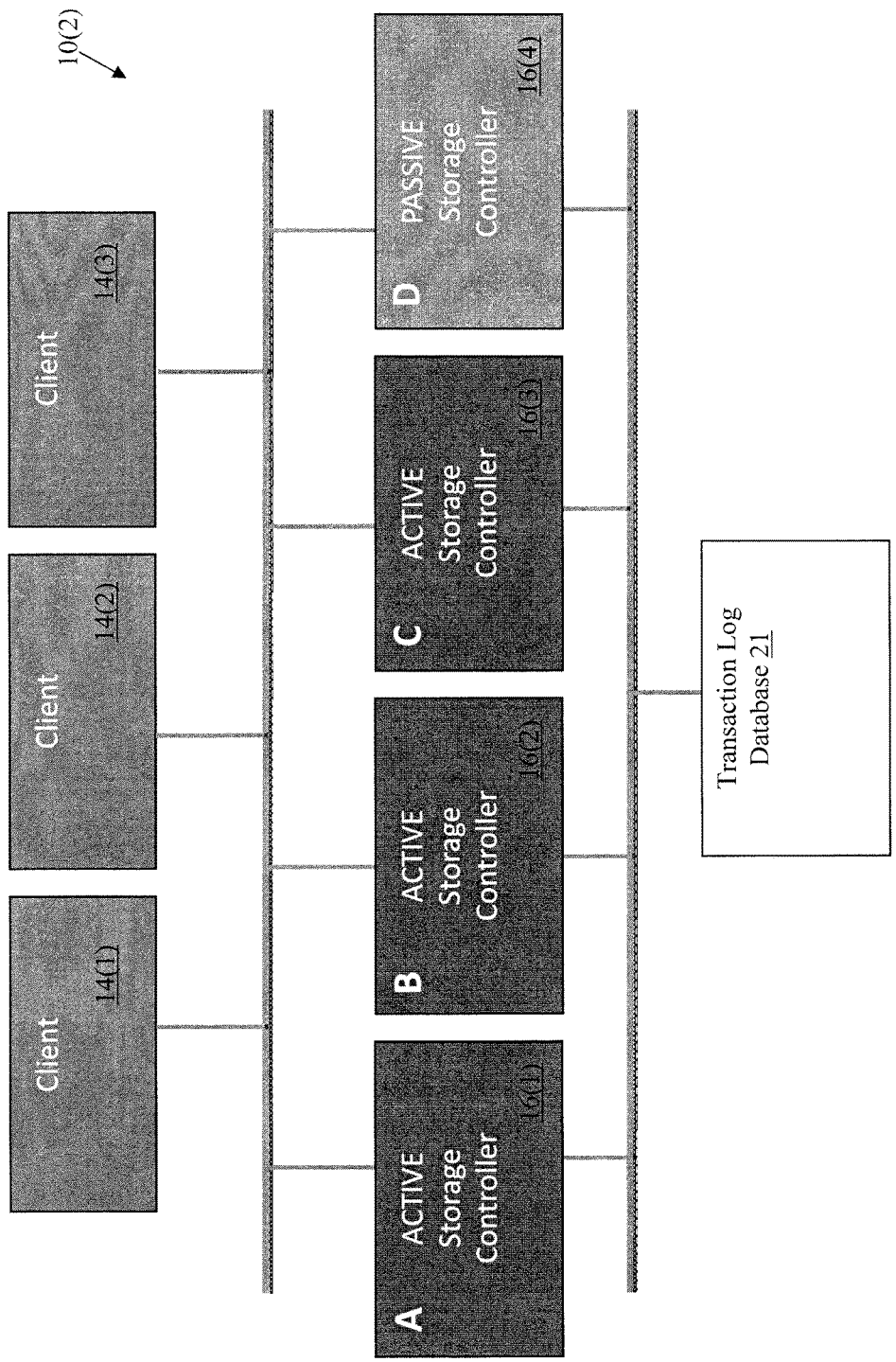
FIG. 5 is another exemplary network environment with three active storage controllers and a passive storage controller.

Referring more specifically to FIG. 5, in another example, another exemplary network environment 10(2) with three active storage controllers 16(1), 16(2), and 16(3) and a passive storage controller 16(4) is illustrated. Additionally, the network environment 10(2) in this example includes three client devices 14(1), 14(2), 14(3), and a transaction log database.

Figure 6:
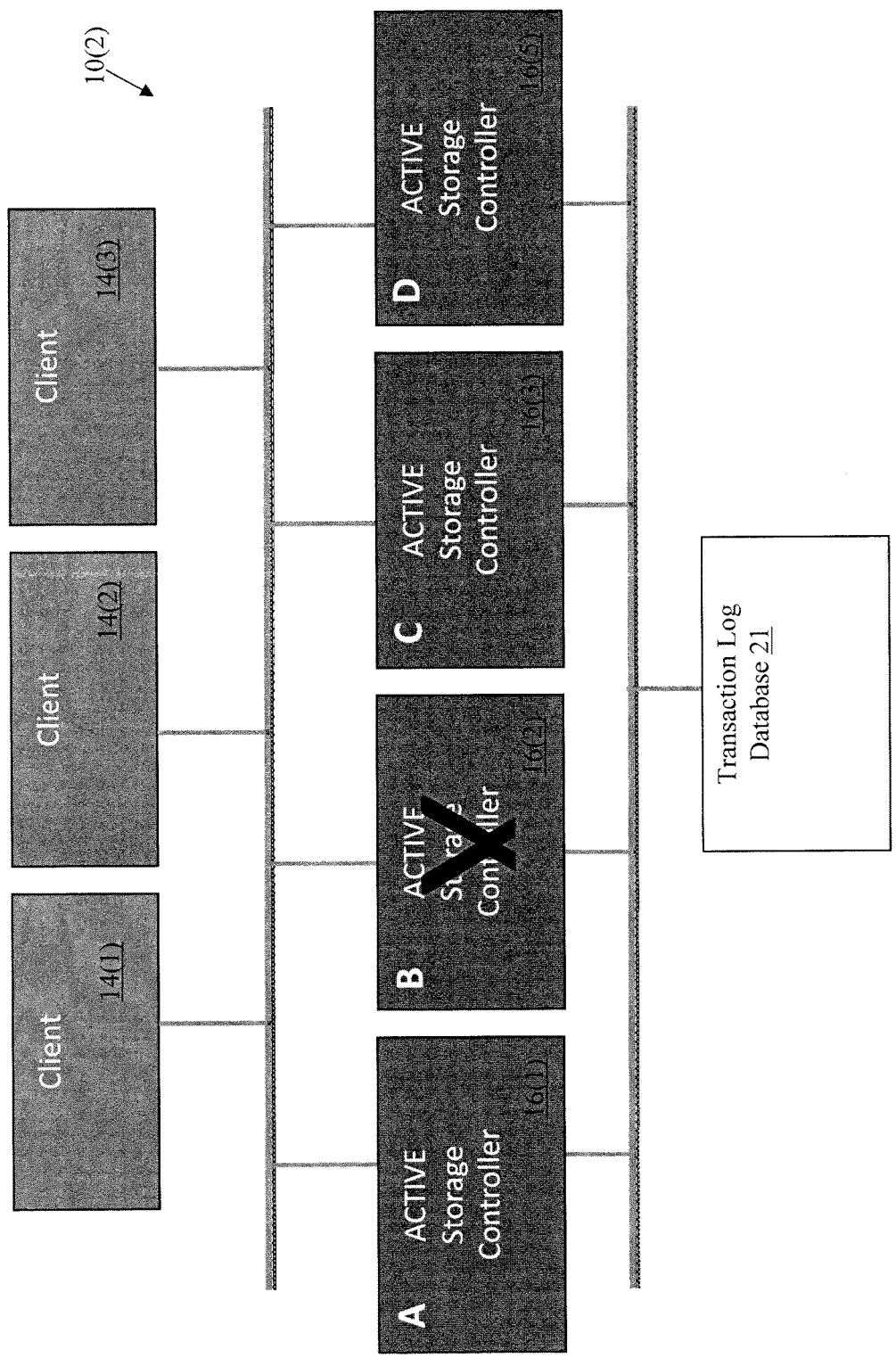
FIG. 6 is the exemplary network environment of FIG. 5 in which an active storage controller has failed and a formerly passive storage controller has become an active storage controller.

Referring more specifically to FIG. 6, the exemplary network environment 10(2) is illustrated in which one of the active storage controllers 16(2) (also referred to in FIG. 6 as "storage controller B") has failed and the formerly passive storage controller 16(4) (also referred to in FIG. 6 as "storage controller D") has become an active storage controller 16(5). Accordingly, in this example active storage controller B 16(2) fails, passive storage controller D 16(4) retrieves storage controller B's 16(2) transaction log from the transaction log database, and replays the transactions, as described and illustrated earlier with reference to FIG. 4. Thereafter, storage controller D transitions its role to an active storage controller 16(5). The transaction log associated with the active storage controller B 16(2) that is retrieved and replayed was previously maintained by the active storage controller B 16(2) as described and illustrated earlier with reference to FIG. 3.

Figure 7:
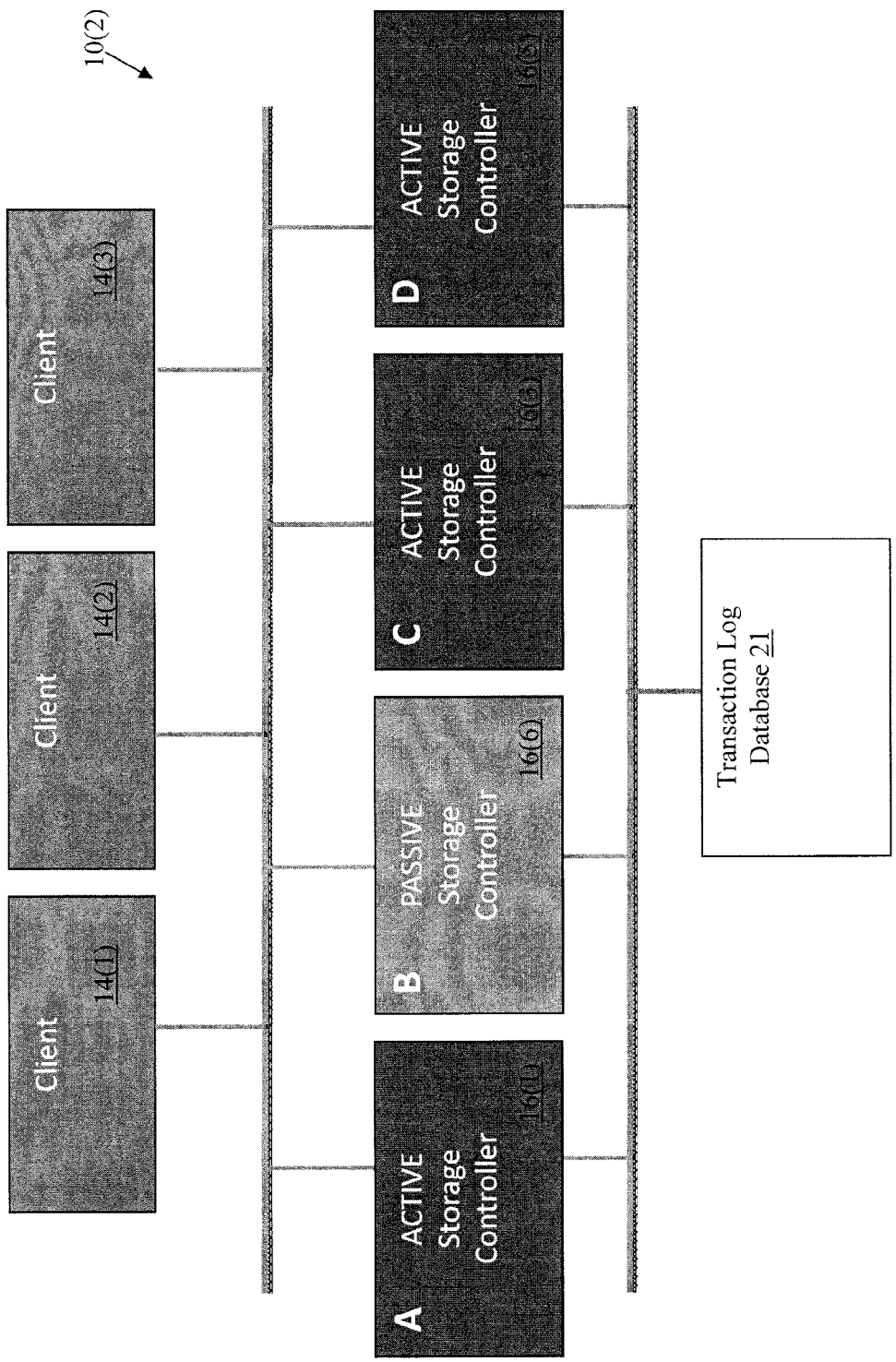
FIG. 7 is the exemplary network environment of FIGS. 5 and 6 in which an active storage controller that failed has become a passive storage controller.

Referring more specifically to FIG. 7 an exemplary network environment 10(2) is illustrated in which the one of the active storage controllers 16(2) that failed has become a passive storage controller 16(6). Accordingly, in this example, once storage controller B is healed, it returns to the storage fabric as passive controller 16(6).

Accordingly, with this technology, a passive storage controller can retrieve and replay transactions in a transaction log corresponding to a failed active storage controller and retrieved from a transaction log database. By maintaining transaction logs on a shared memory service, a passive storage controller can monitor any number of active storage controllers. Additionally, this technology is optimized for scalability and network administrators can control the ratio of passive and active storage controllers in order to provide a desired level of protection and availability. Further, high availability of storage controllers can advantageously be provided on a cloud platform without requiring replication of data and associated cost, with reduced disruption to applications utilizing the storage controllers, and with increased scalability.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
monitoring, by a first storage controller, a plurality of storage controllers staging storage transactions in transaction logs to determine when a failure of at least one of the plurality of storage controllers occurs;
determining, by the first storage controller, that a failure of a second storage controller of the plurality of storage controllers has occurred;
remapping, to the first storage controller, one or more storage devices mapped to a second storage controller determined to have failed;
retrieving from a transaction log database a first of the transaction logs corresponding to the second storage controller, wherein the transaction log database is separate from the storage controllers and is accessible over at least one communication network by the storage controllers; and
replaying one or more transactions in the first transaction log with the first storage controller.

2. The method of claim 1, wherein each of the transaction logs corresponds to a different one of the plurality of storage controllers.

3. The method of claim 1, wherein the monitoring comprises receiving a heartbeat periodically from each of the plurality of storage controllers, wherein determining the failure of the second storage controller is based on not receiving a heartbeat from the second storage controller for a specified time period.

4. The method of claim 3, wherein a heartbeat comprises an identifier of a corresponding one of the plurality of storage controllers sending the heartbeat, wherein retrieving the first transaction log comprises retrieving the first transaction log based on an identifier of the second storage controller in the heartbeat of the second storage controller.

5. The method of claim 1 further comprising remapping to the first storage controller a network interface assigned to the second storage controller.

6. The method of claim 1, wherein the first storage controller monitoring the plurality of storage controllers comprises the first storage controller operating in a passive state and the plurality of storage controllers operating in an active state.

7. The method of claim 6 further comprising the first storage controller switching to operating in the active state after replaying the one or more transactions in the first transaction log.

8. The method of claim 6 further comprising operating the second storage controller in the passive state after recovery of the second storage controller.

9. The method of claim 1, wherein the first storage controller is a virtual storage controller.

10. A storage fabric comprising:
a plurality of storage controllers communicatively coupled to a plurality of storage devices;
each of the plurality of storage controllers comprising:
first program instructions executable to cause a storage controller to operate in an active state, wherein an active state storage controller stages storage transactions in a transaction log for the storage controller, and
second program instructions executable to cause a storage controller to operate in a passive state, wherein a passive state storage controller
monitors active state storage controllers to determine when a failure of one of the active state storage controllers has occurred;
remaps, to the passive state storage controller, one or more of the plurality of storage devices previously assigned to a failed one of the active state storage controllers,
retrieves from a transaction log database a first transaction log of a plurality of transaction logs corresponding to the failed one of the active state storage controllers, wherein the transaction log database is separate from the plurality of storage controllers and is accessible over at least one communication network by the plurality of storage controllers; and
replays one or more transactions in the first transaction log with the passive state storage controller.

11. The storage fabric of claim 10, wherein each of the plurality of transaction logs corresponds to a different active state storage controller.

12. The storage fabric of claim 10, wherein the first program instructions further comprise executable instructions to cause an active state storage controller to periodically communicate a heartbeat to a passive state storage controller, wherein the second program instructions to monitor active state storage controllers comprise executable instructions to cause a passive state storage controller to determine failure of an active state storage controller when a heartbeat from the active state storage controller has not been received for a specified time period.

13. The storage fabric of claim 12, wherein a heartbeat comprises an identifier of the one of the active state storage controllers communicating the heartbeat, wherein the second program instructions that cause a passive state storage controller to retrieve the first transaction log comprises program instructions executable to cause a passive state storage controller to retrieve the first transaction log based on an identifier of the failed one of the plurality of storage controllers.

14. The storage fabric of claim 10, wherein the second program instructions further comprise instructions executable to cause a passive state storage controller to remap to the passive state storage controller a network interface previously assigned to the failed one of the active state storage controllers.

15. The storage fabric of claim 10, wherein the second program instructions comprise program instructions to invoke the first program instructions after replay of the one or more transactions in the first transaction log.

16. The storage fabric of claim 10, wherein at least some of the plurality of storage controllers are virtual storage controllers.

17. One or more non-transitory machine readable media comprising instructions for facilitating n-way high availability storage services with a passive state storage controller, the instructions to:
monitor a plurality of active state storage controllers to determine when a failure of at least one of the plurality of active state storage controllers occurs, wherein active state storage controllers stage storage transactions in transaction logs as part of servicing storage traffic;
remap, to the passive state storage controller, one or more storage devices mapped to a failed active state storage controller;
retrieve from a transaction log database a first of the transaction logs corresponding to the failed active state storage controller, wherein the transaction log database is separate from the storage controllers and is accessible over at least one communication network by the storage controllers; and
replay one or more transactions in the first transaction log with the passive state storage controller.

18. The non-transitory machine readable media of claim 17 further comprising instructions to instantiate a virtual storage controller and operate the virtual storage controller in a passive state.

19. The non-transitory machine readable media of claim 17 further comprising instructions to change the passive state storage controller to operate as an active state storage controller after replay of the one or more transactions in the first transaction log.

20. The non-transitory machine readable media of claim 17 further comprising instructions to operate the failed one of the plurality of active state storage controllers as a passive state storage controller after recovery.

* * * * *